US009722372B2

(12) United States Patent
Byrne

(10) Patent No.: US 9,722,372 B2
(45) Date of Patent: Aug. 1, 2017

(54) LONGITUDINALLY ADJUSTABLE FLAT WIRE RACEWAY

(71) Applicant: Norman R Byrne, Ada, MI (US)

(72) Inventor: Norman R Byrne, Ada, MI (US)

( * ) Notice: Subject to any disclaimer, the term of this patent is extended or adjusted under 35 U.S.C. 154(b) by 0 days.

(21) Appl. No.: 14/056,219

(22) Filed: Oct. 17, 2013

(65) Prior Publication Data

US 2015/0111403 A1    Apr. 23, 2015

(51) Int. Cl.
*H01R 25/16* (2006.01)
*H02G 3/38* (2006.01)

(52) U.S. Cl.
CPC ......... *H01R 25/162* (2013.01); *H01R 25/164* (2013.01); *H02G 3/388* (2013.01)

(58) Field of Classification Search
CPC .................................................... H02G 3/288
USPC ........................................ 439/215, 32, 162
See application file for complete search history.

(56) References Cited

U.S. PATENT DOCUMENTS

| 1,187,010 | A |   | 6/1916  | Rodrigues |                |
|-----------|---|---|---------|-----------|----------------|
| 2,540,575 | A |   | 2/1951  | Finizie   |                |
| 4,046,448 | A | * | 9/1977  | Miller    | ........ F21V 19/006 |
|           |   |   |         |           | 362/457        |
| 4,135,775 | A |   | 1/1979  | Driscoll  |                |
| 4,148,544 | A | * | 4/1979  | Markowitz | ............ H01R 24/76 |
|           |   |   |         |           | 439/640        |
| 4,382,648 | A |   | 5/1983  | Propst    |                |
| 4,551,577 | A |   | 11/1985 | Byrne     |                |
| 4,579,403 | A |   | 4/1986  | Byrne     |                |
| 4,959,021 | A |   | 9/1990  | Byrne     |                |
| 4,993,576 | A |   | 2/1991  | Byrne     |                |
| 5,013,252 | A |   | 5/1991  | Nienhuis  |                |
| 5,041,002 | A | * | 8/1991  | Byrne     | ............ H02G 3/288 |
|           |   |   |         |           | 439/211        |
| 5,073,120 | A |   | 12/1991 | Lincoln   |                |
| 5,096,431 | A |   | 3/1992  | Byrne     |                |
| 5,096,434 | A |   | 3/1992  | Byrne     |                |
| 5,141,447 | A | * | 8/1992  | Poirier   | ............ H01R 25/162 |
|           |   |   |         |           | 439/207        |
| 5,164,544 | A |   | 11/1992 | Snodgrass |                |
| 5,178,555 | A |   | 1/1993  | Kilpatrick|                |
| 5,259,787 | A |   | 11/1993 | Byrne     |                |
| 6,652,288 | B2| * | 11/2003 | Laukhuf et al. | ............ 439/32 |
| 7,185,850 | B2| * | 3/2007  | Callahan  | ............ B60N 2/0725 |
|           |   |   |         |           | 174/74 R       |
| 7,387,520 | B2| * | 6/2008  | Gosling   | ............ H01R 25/164 |
|           |   |   |         |           | 439/215        |

(Continued)

*Primary Examiner* — Neil Abrams
(74) *Attorney, Agent, or Firm* — Gardner, Linn, Burkhart & Flory, LLP

(57) ABSTRACT

A flat wire assembly is positioned between retracted and extended states. The assembly includes an adjustable flat wire junction block having a main body. An extender extends outwardly from the main body. A cable which houses wires extends outwardly from the outer end of the extender. A cover plate extender is positionable between extended and retracted states. Sliders associated with slide brackets and associated with blade/wire connectors connect the flat wire blades to wires so that the positions of the sliders along the length of the flat wire blades are adjustable, thereby adjusting the length of the flat wire assembly. A cover and a base may be used to enclose the flat wire blades and the wires, and may be extended or retracted with the sliders sliding along the flat wire blades.

15 Claims, 18 Drawing Sheets

(56) References Cited

U.S. PATENT DOCUMENTS

| | | | | |
|---|---|---|---|---|
| 7,922,508 B2* | 4/2011 | Kondas | ............... | H01R 25/161 |
| | | | | 439/211 |
| 8,342,855 B2* | 1/2013 | Tsirangelos | .............. | H02G 3/00 |
| | | | | 439/162 |
| 8,801,445 B2* | 8/2014 | Byrne | ........................... | 439/215 |
| 8,882,523 B2* | 11/2014 | Byrne | ........................... | 439/215 |
| 9,048,598 B2* | 6/2015 | Byrne et al. | | |
| 9,088,117 B2* | 7/2015 | Rosenblum | .......... | H01R 25/006 |

\* cited by examiner

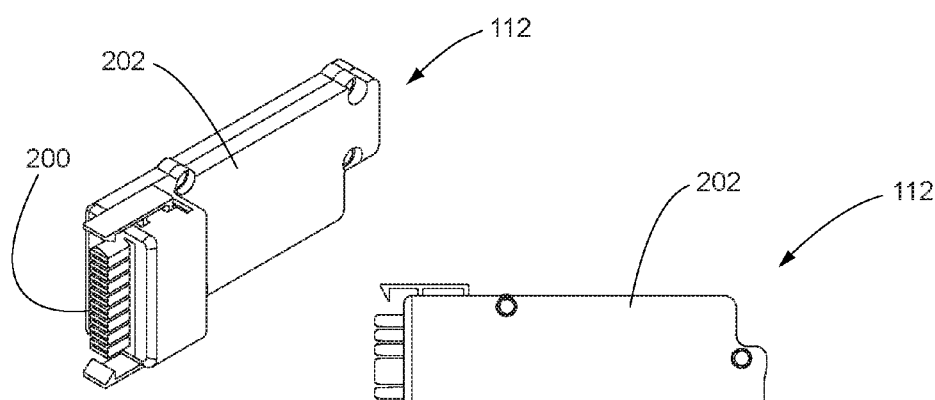
Fig. 28
Fig. 29
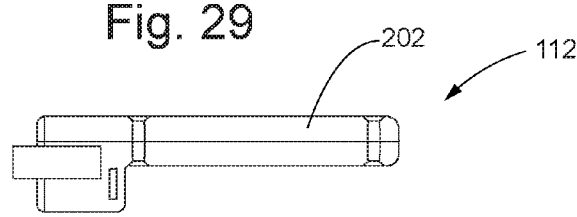
Fig. 30
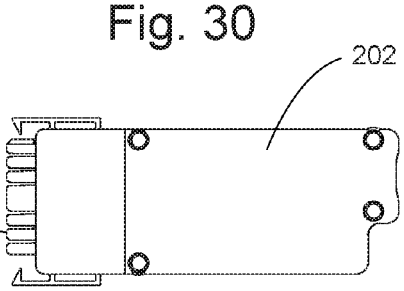
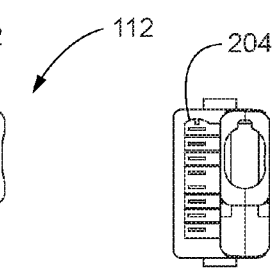
Fig. 31   Fig. 32   Fig. 33
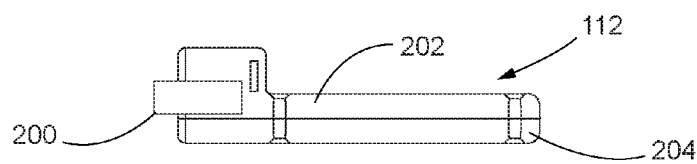
Fig. 34

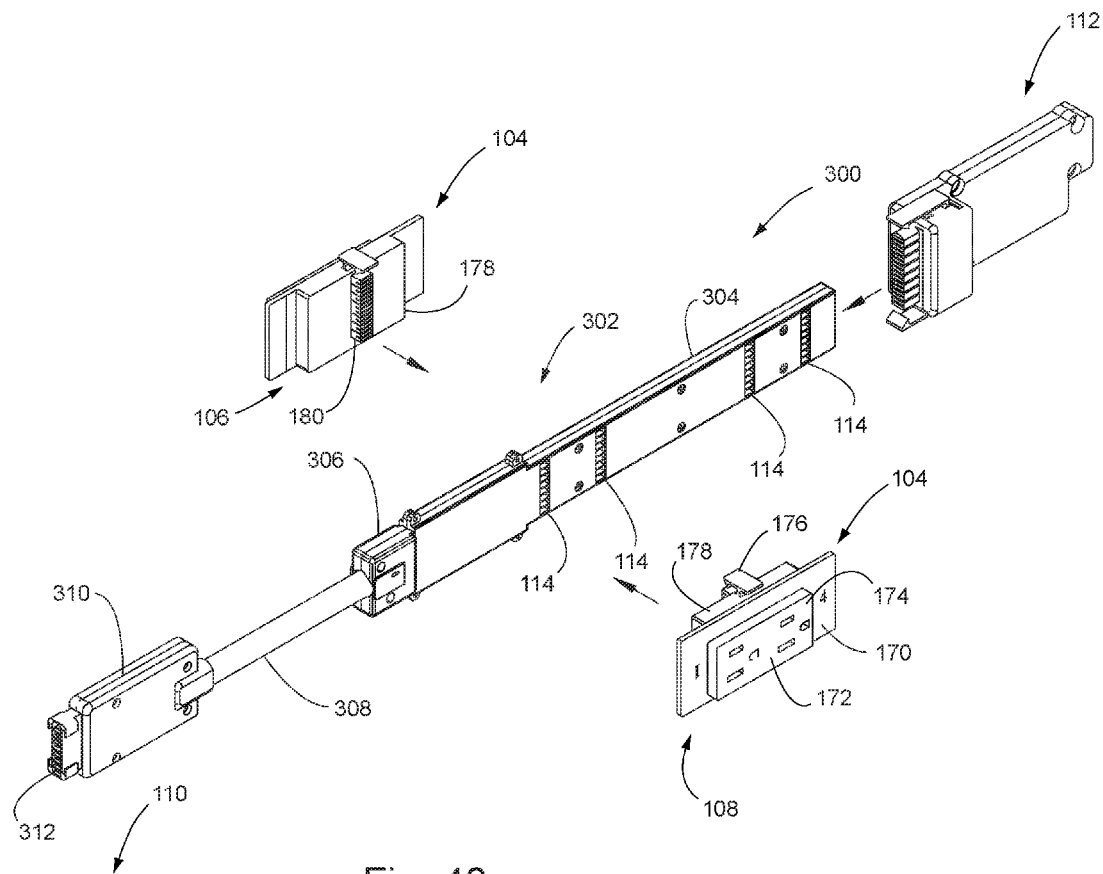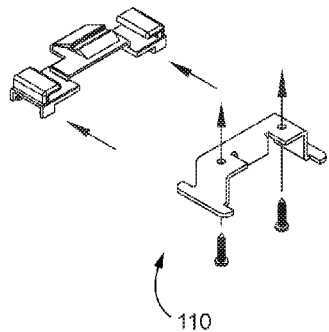
Fig. 40

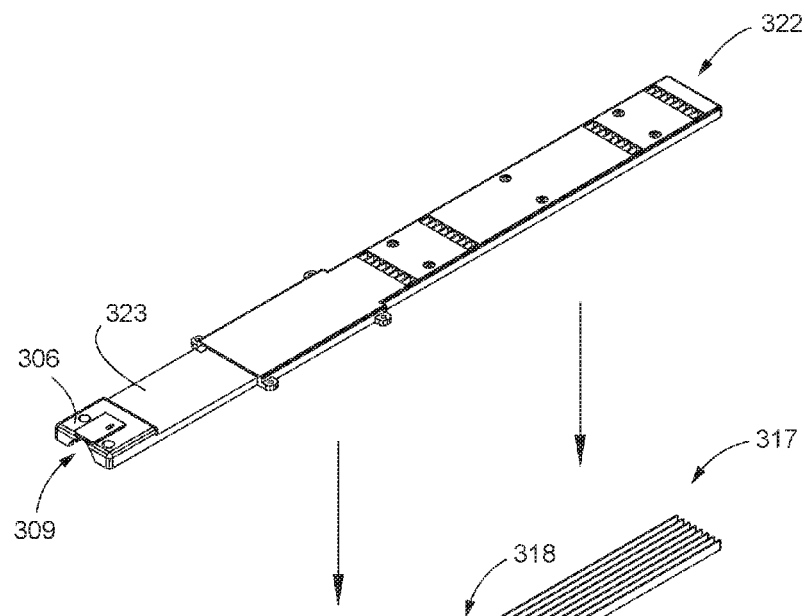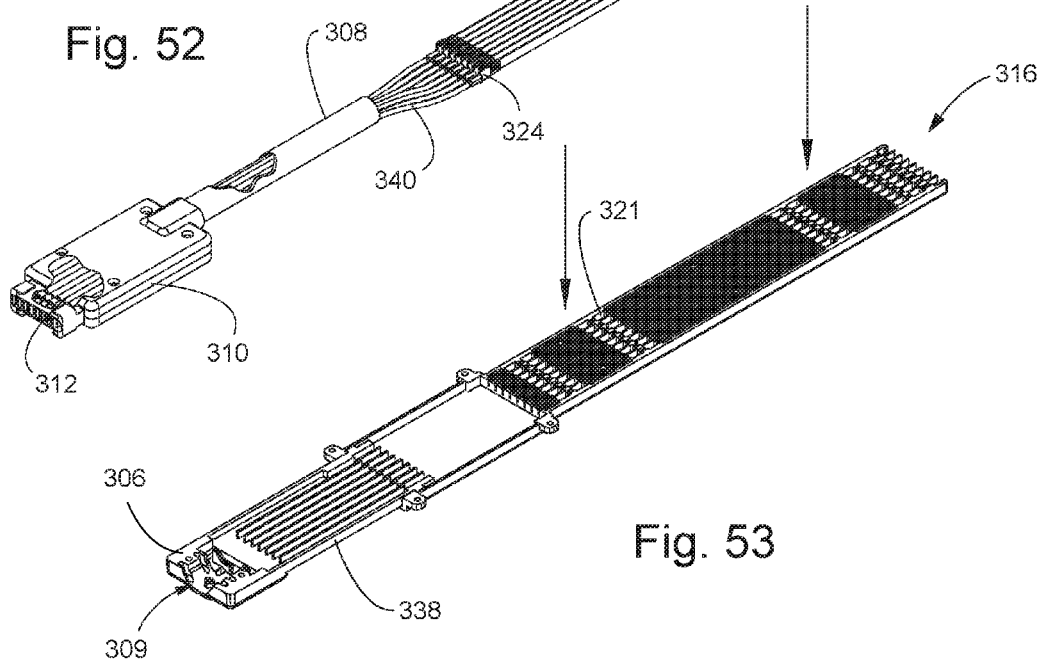

LONGITUDINALLY ADJUSTABLE FLAT WIRE RACEWAY

FIELD OF THE INVENTION

The invention relates to electrical power and communications distribution systems and, more particularly, to distribution systems employing raceways and wires for distributing power on an in-line basis.

BACKGROUND

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the special configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, internet communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source. Under such circumstances, the interconnecting wiring becomes a significant problem. That is, special modifications may have to be made to power systems of wall panels to be used in such a configuration. Because interchangeability of wall panels is highly desirable, custom modifications are preferably avoided. Still further, modifications of wall panels on site at the installation facility is complex and may be relatively expensive.

In addition to the foregoing issues, problems can arise with respect to the use of junction blocks and the amount of room which may exist within a raceway. That is, raceways require sufficient room so as to provide for junction blocks, electrical outlet receptacle blocks, and cabling extending between junction blocks and between adjacent panels.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

With respect to both of the foregoing systems, and other than in the special intersecting relationship, one half of the double set of terminals of these systems is superfluous. There is a distinct disadvantage in modern day systems, where several independent electrical circuits are needed in a wall panel system, with each requiring separate connectors. Space for such circuits and their connectors is very limited in the raceway areas of modern, thin-line wall panels.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al. patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al., U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner, the hinged cantilever beam is deflected until the rail is in alignment with the channel for engagement with the structural support member.

Another issue which exists with respect to raceway systems has to do with size, when the number of circuits provided by 8, 12 or 14 wire electrical configurations is unnecessary. For example, a system can be provided through the use of four wires, where the four wires can provide for two separate electrical circuits. In such an instance, each circuit consists of a hot, common and ground wire. The two separate circuits utilize two separate hot wires. However, the two circuits also use the same ground wire and the same common or neutral wire. With these types of configurations, it would be preferable for the electrical holding components to be of a size which would be appropriate for four wire circuitry.

A still further issue which exists with respect to raceway systems relates to adjustability. During installation of various systems, it would be advantageous to have some adjustability with respect to the lengths of electrical elements extending in a longitudinal direction along the raceway systems. Essentially, with it being provided in systems having adjustability is the capability of relative positioning of connectors, receptacles, and the like along the raceway system. One such system addressing these issues is disclosed in Byrne, U.S. Pat. No. 4,579,403, issued Apr. 1, 1986. In this patent, Byrne disclosed the use of coiled wires within a compartment which had a capability of being at least partially uncoiled for purposes of adjusting distances between connectors attached to the wires, while still maintaining continuous electrical conductivity there between.

SUMMARY OF THE INVENTION

In one aspect of the invention, a flat wire assembly is adapted for use in a power distribution system for distributing power to electrical receptacles and other components. The assembly includes a flat wire junction block for transmitting power, and a set of flat wire blades positioned within an interior of the junction block. The blades form at least one 3-blade circuit carrying electrical power in the form of hot, neutral and ground polarities. A set of wires are coupled to the set of flat wire blades and extend longitudinally in the same orientation as the flat wire blades. Wire/blade connectors are provided for electrically connecting the set of wires to the blades. Adjustment elements are provided for adjusting the relative positioning of the wire/blade connectors along the lengths of the flat wire blades. The adjustment of relative positioning permits adjustment of the length of the flat wire assembly between extended and retracted positions.

The adjustment of the relative positioning permits further adjustment of the length of the flat wire assembly along a continuum. The flat wire junction block includes a main body, with an extender extending outwardly from one end of the main body. A cable having wires positioned therein extends outwardly from the outer end of the extender. The cable houses wires connected to the flat wire blades within an interior of the main body. One end of the cable is connected to an end of the extender, with an opposing end of the cable being connected to an end of a jumper. The jumper is utilized to connect further jumper cables to a male jumper connector. A junction block connector extends from an opposing end of the main body of the junction block.

The flat wire assembly can be in a retracted state, with the extender telescoped into an end of the main body of the junction block. When the assembly is in an extended mode, the extender extends outwardly from the end of the main body of the junction block.

The flat wire junction block can further comprise a base having a pair of slide brackets positioned on the base, and extendable between the retracted and extended state. The junction block can include a center section, with the section comprising the internal blade circuit, and with the circuit having a series of flat wire blades. A cover plate covers the center section, and includes a cover plate extender positioned between retracted and extended states. When the assembly is in the retracted state, the cover plate extender is in a retracted state, and the slide brackets are positioned in a retracted state, with the length of the adjustable flat wire assembly being at a minimum.

To extend the flat wire assembly from retracted to extended positions, the cover plate extender is first moved outwardly to an extended position. The slide brackets are associated with the base and then also positioned so as to be slid outwardly.

When the slide brackets are positioned so as to be slid outwardly, the adjustment elements comprising sliders are utilized to slide along the flat wire blades until they are positioned in a desired position along the length of the blades. The flat wire blades remain electrically connected to the wires, whether in an extended or retracted position.

BRIEF DESCRIPTION OF THE DRAWINGS

FIG. 28 is a perspective view of a male/female jumper connectable to the flat wire junction block as illustrated in FIGS. 1 and 2;

FIG. 29 is a reversed, elevation view of a rear side of the male/female jumper shown in FIG. 28, but further shown rotated 180° from the perspective view shown in FIG. 28;

FIG. 30 is a plan view of the male/female jumper shown in FIG. 28;

FIG. 31 is a left-hand view of the male/female jumper shown in FIG. 28, and further showing the jumper female connection;

FIG. 32 is a front, elevation view of the male/female jumper shown in FIG. 28;

FIG. 33 is a right-end view of the male/female jumper shown in FIG. 28, and further showing the male connection which may be utilized for electrical and mechanical attachment to a further jumper cable;

FIG. 34 is an underside view of the male/female jumper shown in FIG. 28;

FIG. 40 is a perspective view of an adjustable flat wire assembly in accordance with the invention, and with the assembly shown in a retracted configuration;

FIGS. 48, 49 and 50 represent, collectively, a perspective exploded view of the adjustable flat wire assembly shown in FIG. 40, with the flat wire assembly in a retracted state;

FIGS. 51, 52 and 53 are substantially similar to FIGS. 48, 49 and 50, respectively, 15 in that they represent side housings and internal flat wire configurations in adjustable flat wire assembly, subject to the concept that FIGS. 51, 52 and 53 illustrate the flat wire assembly in an extended adjustable state, corresponding to that of FIG. 41;

DESCRIPTION OF THE PREFERRED EMBODIMENTS

Figure 1:
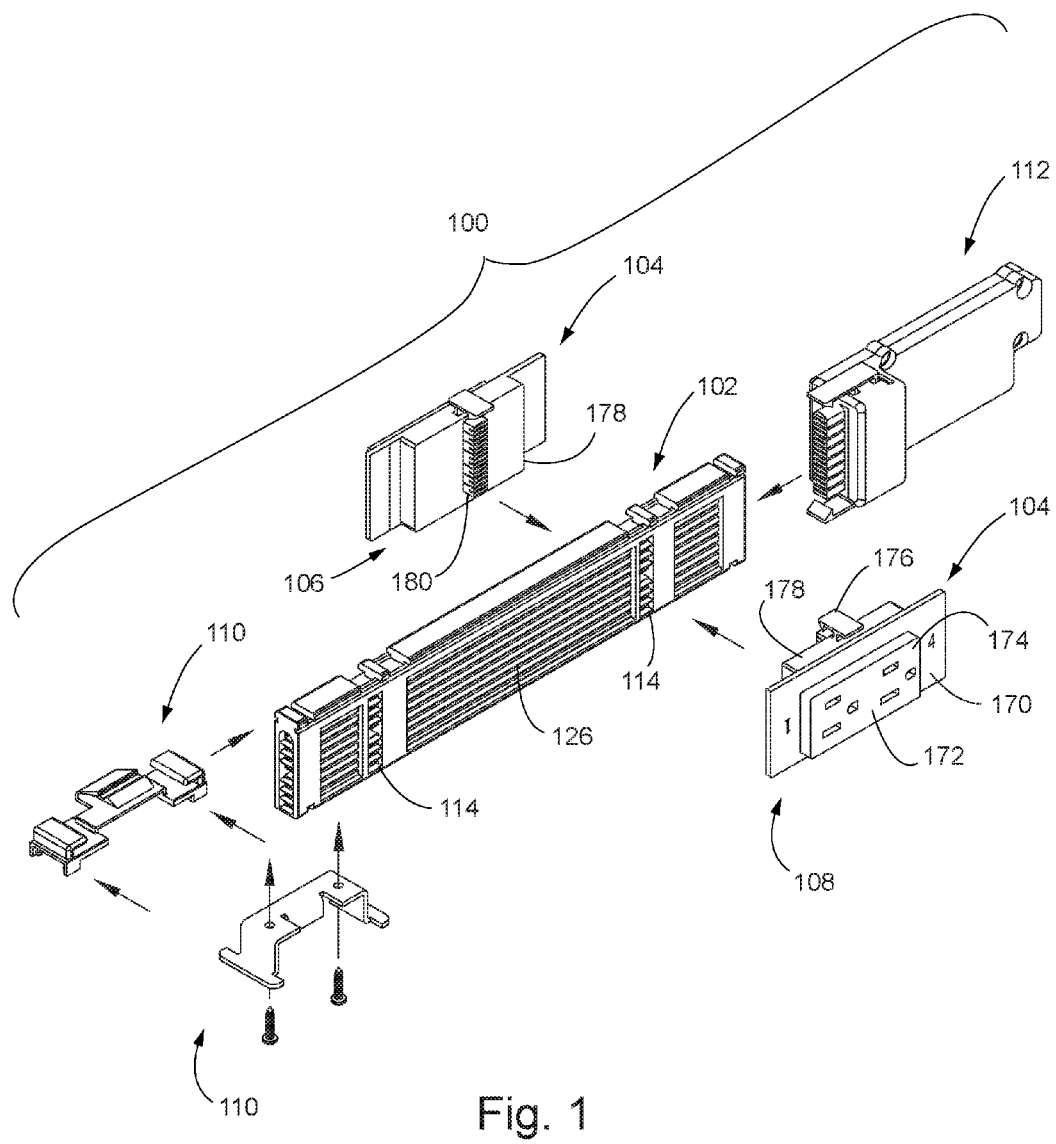
FIG. 1 is an exploded isometric view of the entire assembly of a flat wire junction block, and further showing a mounting bracket and two-way receptacle blocks.
Figure 56:
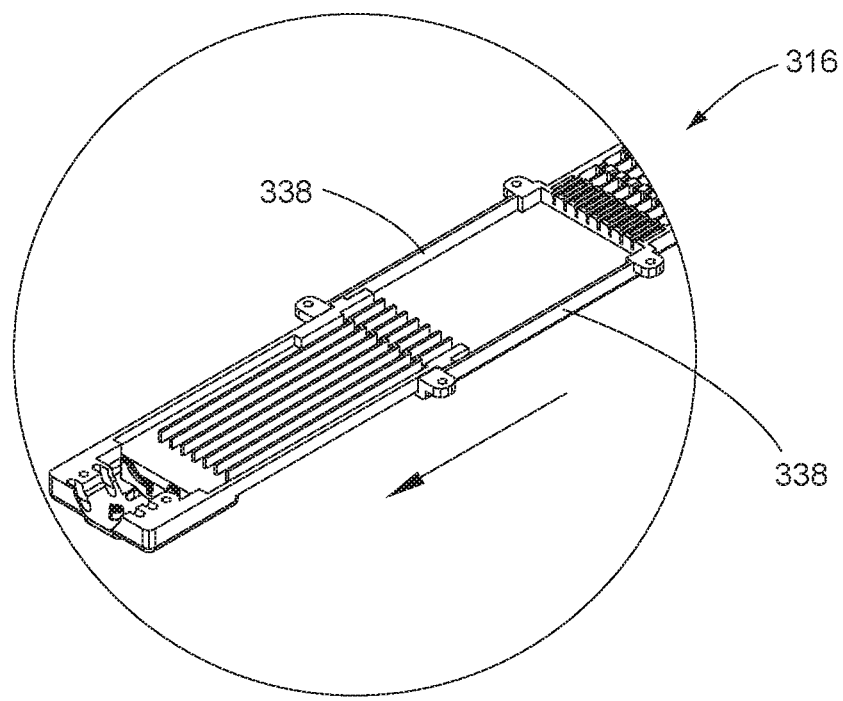
FIG. 56 is an enlarged view of the flat wire assembly shown in FIG. 40, and again showing the assembly in an extended state.
Figure 57:
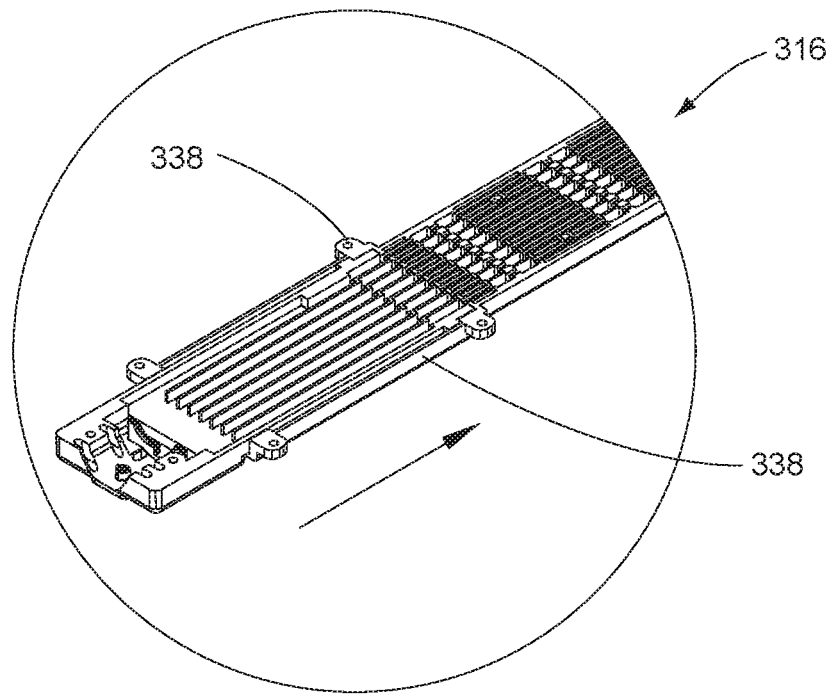
FIG. 57 is an enlarged view similar to FIG. 56, but showing a portion of the flat wire assembly as it is configured when the assembly is in the retracted state.

The principles of the invention are disclosed, by way of example, in an adjustable flat wire assembly as illustrated primarily in FIGS. 1-57. The general concept of utilizing a flat wire assembly for electrical power and communication distribution systems within modular office systems and other systems and situations where modularity of electrical components is required is shown in the assemblies illustrated in FIGS. 1-39. Within the assemblies shown therein, some adjustability is shown with respect to the use of jumpers which may employ curled wire or cable to provide extension and retraction of such wire or cable within conduit and the like. Exemplary embodiments depicting primary concepts of the invention are illustrated in FIGS. 40-57, where adjustability is provided with respect to the retraction or extension of the "effective" lengths of a junction block employing flat wire for electrical connections.

Figure 2:
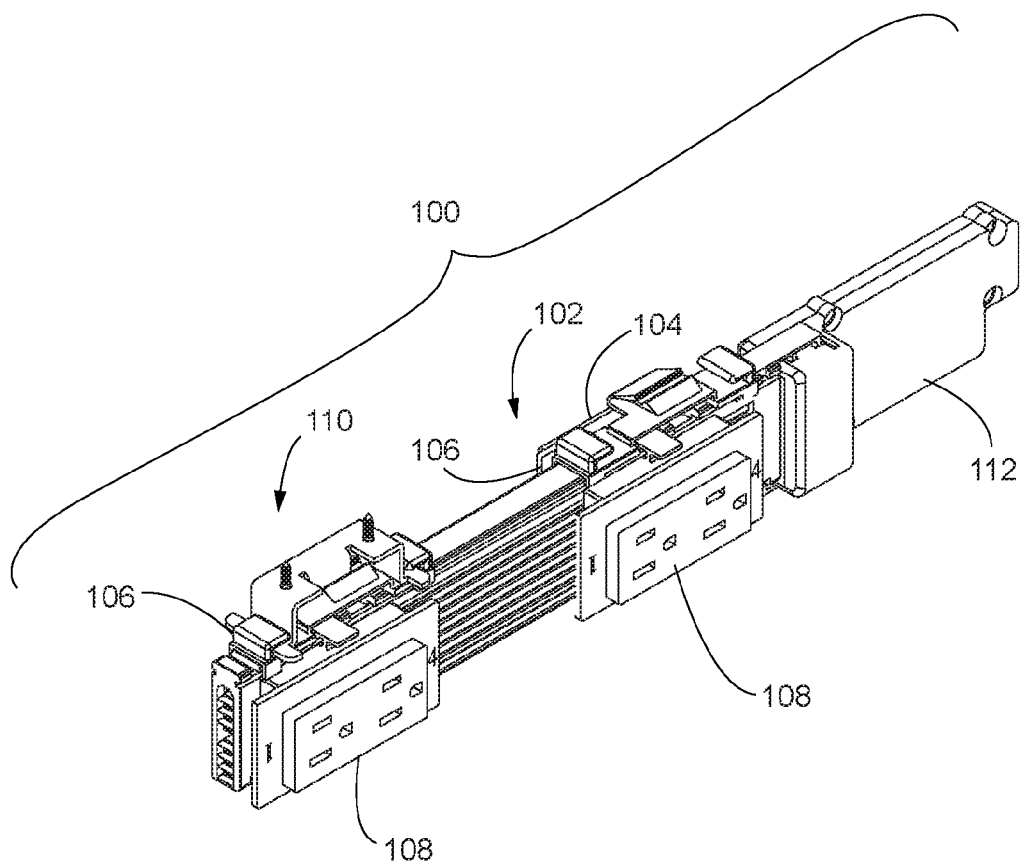
FIG. 2 is a perspective view of the flat wire electrical assembly shown in FIG. 1, with the entirety of the assembly in an assembled configuration.
Figure 3:
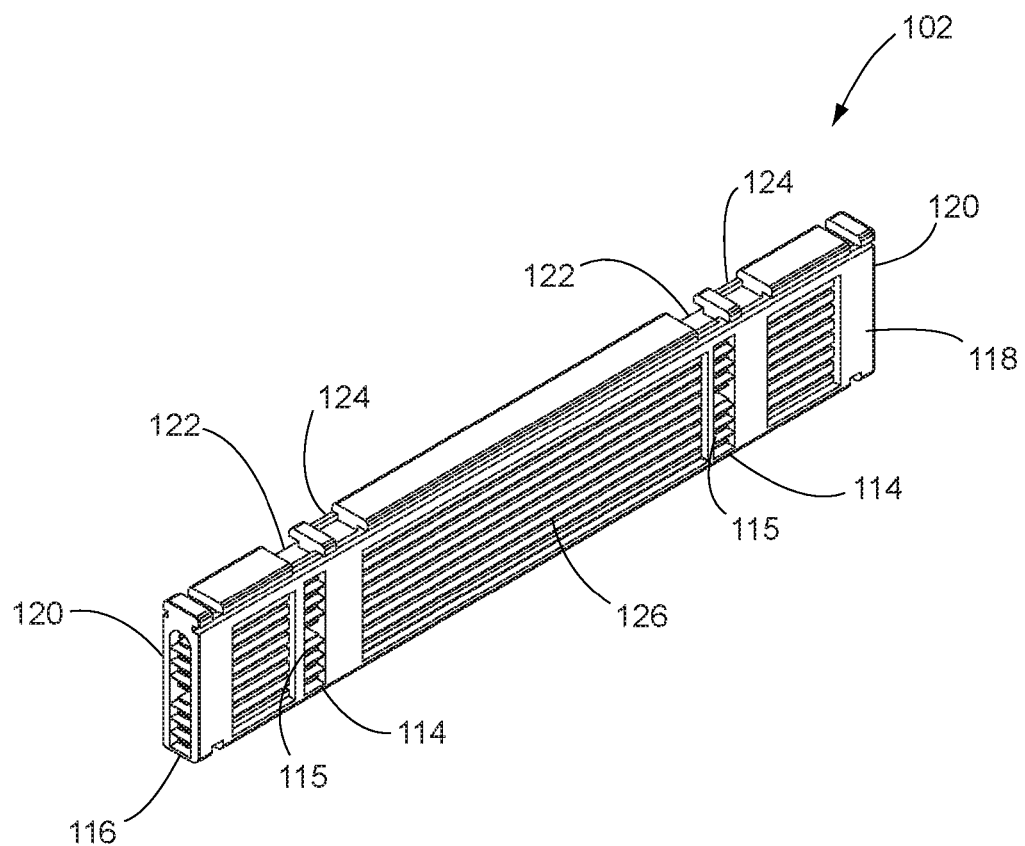
FIG. 3 illustrates a perspective view of the flat wire junction block.
Figure 4:
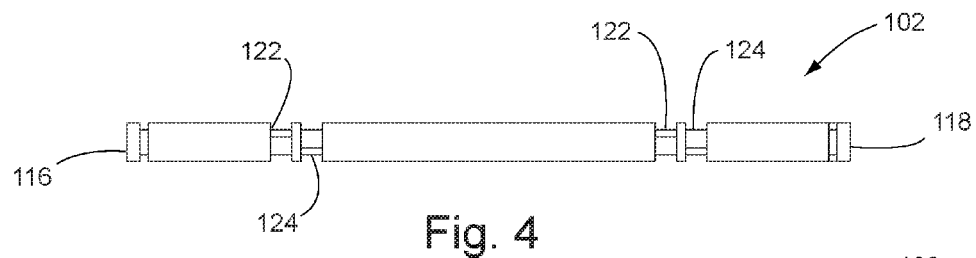
FIG. 4 is a plan view of the flat wire junction block shown in FIG. 3.

Turning to the specific drawings, a flat wire assembly 100 employing adjustability of wire or cable is illustrated in an exploded format in FIG. 1, and in assembled format in FIG. 2. It should be emphasized that the particular type of assembly illustrated herein as assembly 100 is one of a number of modular configurations which may be utilized with the principles of the invention. The flat wire assembly 100 includes a flat wire junction block 102 illustrated in FIGS. 1 and 2, and also illustrated in a stand-alone format in FIGS. 3-9. In addition to the flat wire junction block 102, and as further illustrated in FIGS. 1 and 2, the assembly 100 includes a pair of two-way duplex receptacles 104. In the particular example shown in FIGS. 1 and 2, the duplex receptacles 104 include a first two-way duplex receptacle 106 electrically connected to one side of the flat wire junction block 102, while a second two-way duplex receptacle 106 is connected to an opposing side of the junction block 102. The concept utilizing electrical receptacles with junction blocks has been the subject of a substantial amount of prior development. For example, various types of electrical receptacles are disclosed in the following patents owned by the present inventor: Byrne, OUTLET RECEPTACLE WITH REARRANGEABLE TERMINALS, U.S. Pat. No. 5,096,431 issued Mar. 17, 1992; Byrne, CIRCUIT SELECTING ADAPTER FOR AN ELECTRICAL POWER RECEPTACLE, U.S. Pat. No. 5,087,207 issued Feb. 11, 1992; and Byrne, ELECTRICAL INTERCONNECTION ASSEMBLY WITH ADDITIONAL OUTLET RECEPTACLES, U.S. Pat. No. 6,036,516 issued Mar. 14, 2000. As will be explained in greater detail in subsequent paragraphs herein, each of the two-way duplex receptacles 104 has the capability of alternatively providing one of two circuits to the user. In the particular example shown and described herein, the circuits can be characterized as circuits 1 and 4. When one of the duplex receptacles 104 is connected to the junction block 102 with the numeral "1" being right side up, the duplex receptacle 104 will be connected to a first of two circuits which may be incorporated within the junction block 102. As an alternative, the duplex receptacle 104 can be rotated 180° so that the numeral "4" is right side up. In this case, the duplex receptacle will be electrically connected to a different one of the two circuit configurations provided by the junction block 102.

With further reference to FIG. 1, each of the two-way duplex receptacle 104 includes a socket face 174 having a socket pair 172 extending therethrough. A plate 170 acts as a cover plate for the duplex receptacle 104 when the receptacle 104 is connected to the junction block 102 through a cutout or other type of slot within the side of an office panel or the like. Positioned behind the plate 170 is a circuit box 178 having the electrical connections which will connect the socket pair 172 to the female connector 180 positioned at the rear portion of the duplex receptacle 104 and adapted to be received and electrically connected with one of the junction block male receptacle connectors 114.

In FIG. 1, two of the two-way duplex receptacles 104 are shown in a position to be connected to the junction block 102. In FIG. 2, two of the duplex receptacles 104 (identified also as the second duplex receptacles 108) are positioned on one side of the junction block 102. As apparent to FIG. 1, this configuration is feasible in view of the junction block 102 having a pair of junction block receptacle connectors 114 on each side thereof.

Figure 10:
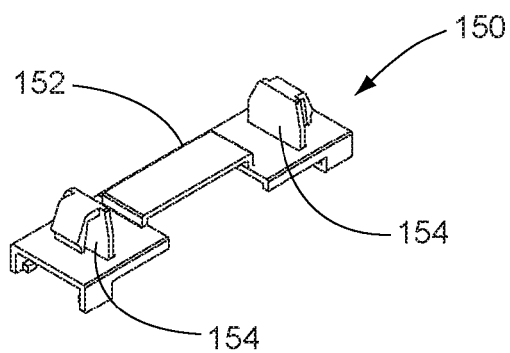
FIG. 10 is a perspective view of a specific type of mounting bracket which can be utilized with the flat wire junction block.
Figure 11:
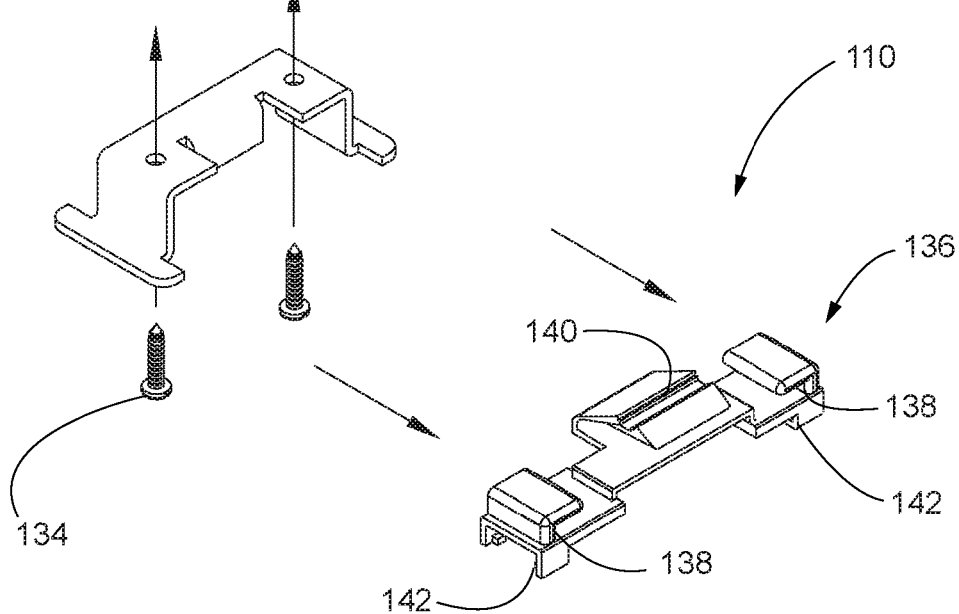
FIG. 11 is a perspective view of a further embodiment of a slide mount which can be utilized with the flat wire junction block shown in FIG. 4.
Figure 12:
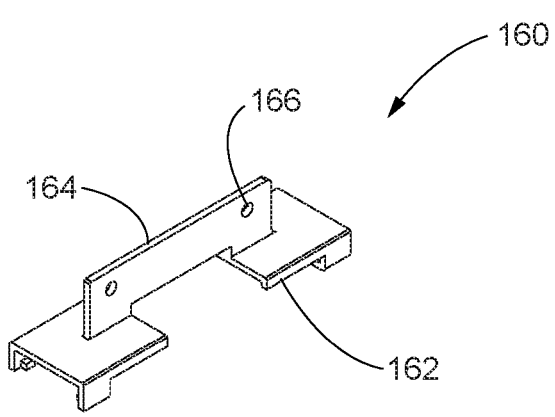
FIG. 12 is a perspective view of a still further embodiment of a mounting bracket, in the form of a screw mount which can be utilized with the flat wire junction block shown in FIG. 4.
Figure 13:
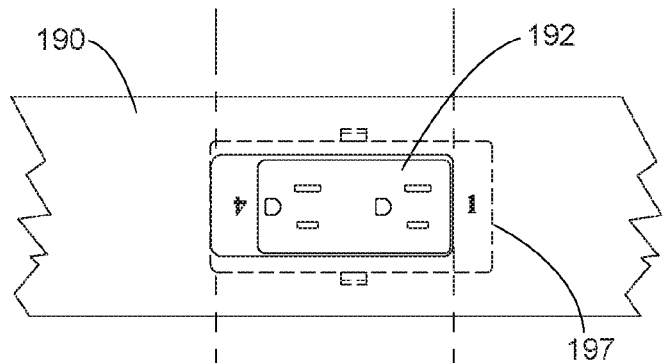
FIG. 13 is a two-way duplex receptacle shown positioned in the back of a cut-up portion of a panel within a duplex receptacle cut-out, and further showing use of the receptacle block with circuit 4, where the cut-out aligns with the cut-out on an opposing side of the panel.
Figure 14:
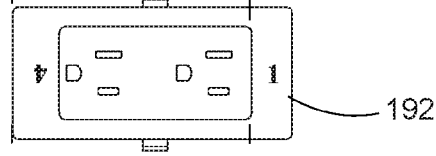
FIG. 14 is a view showing the front of a two-way duplex receptacle positioned on the back of the panel.
Figure 15:
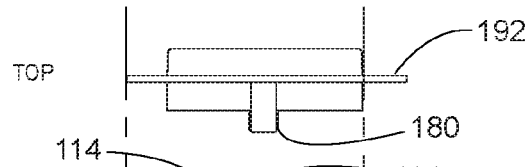
FIG. 15 is a top view of the two-way duplex receptacle of FIG. 14.
Figure 16:
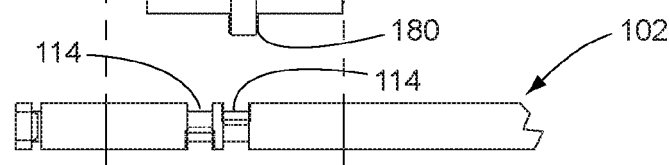
FIG. 16 is a top view of a portion of the flat wire junction block, showing how the two way receptacle plugs into the junction block in an offset configuration.
Figure 17:
FIG. 17 is a bottom view of the two-way duplex receptacle shown in FIG. 14.
Figure 18:
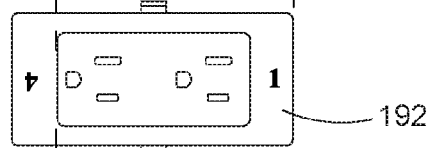
FIG. 18 is a view of the two-way duplex receptacle as appearing in the front of the panel.
Figure 19:
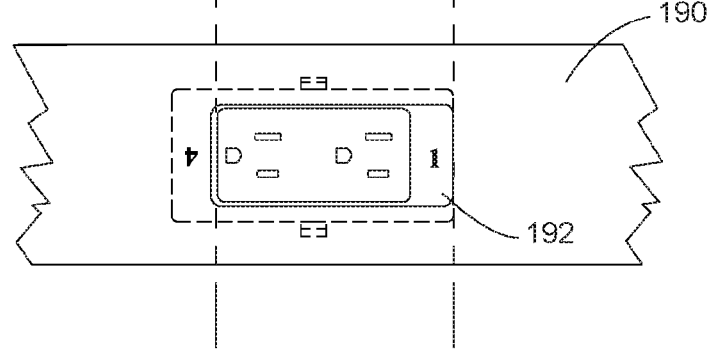
FIG. 19 is an illustration of the two-way duplex receptacle positioned in front of the panel and the duplex receptacle cutout showing circuit 1, where the cut-out aligns with the cut-out on the opposing side of the panel.
Figure 20:
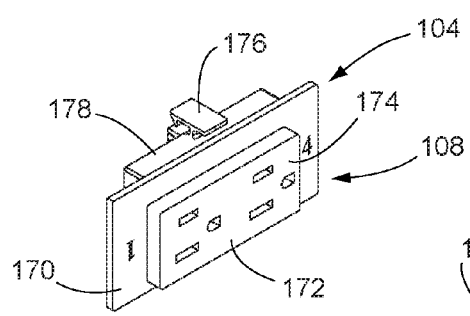
FIG. 20 is a perspective view of the two-way duplex receptacle shown in FIG. 14.
Figure 21:
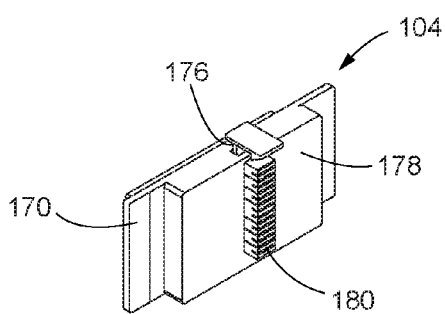
FIG. 21 is a perspective, rear view of the two-way duplex receptacle shown in FIG. 20.
Figure 22:
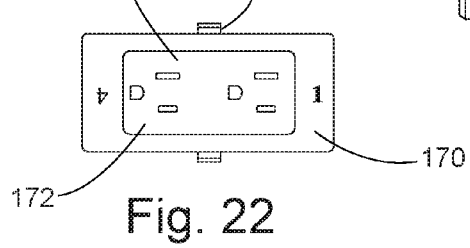
FIG. 22 is a front, elevation view of the two-way duplex receptacle shown in FIG. 20, but with the receptacle rotated so as to correspond to circuit 1 of the two available circuits.
Figure 23:
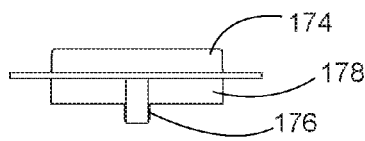
FIG. 23 is a plane view of the duplex receptacle shown in FIG. 22.
Figure 24:
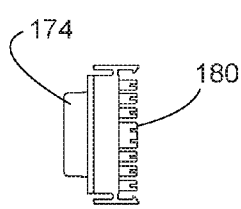
FIG. 24 is a right-hand view of the duplex receptacle shown in FIG. 22, and further showing a side view of the female receptacle connector.
Figure 25:
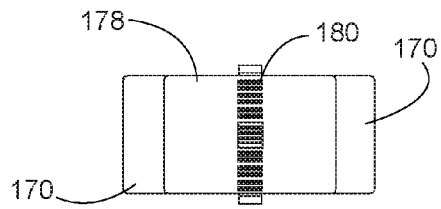
FIG. 25 is a rear, elevation view of the duplex receptacle shown in FIG. 22.
Figure 26:
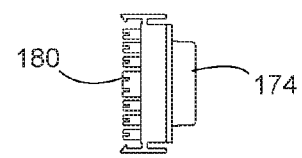
FIG. 26 is a left-hand view of the duplex receptacle shown in FIG. 22, and, like FIG. 24, showing a view of the female receptacle connector.
Figure 27:
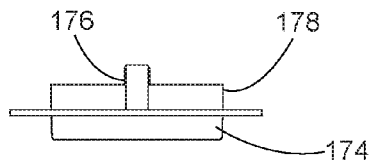
FIG. 27 is an underside view of duplex receptacle shown in FIG. 22.

For purposes of mounting the flat wire assembly 100 to the interior of a raceway of an office furniture panel (not shown), a first mounting bracket 110 can be utilized. The mounting bracket is shown in an exploded view in FIG. 1, and an assembled view in FIG. 2. The mounting bracket is also illustrated in FIG. 11. As shown in FIG. 11, this particular mounting bracket 110 utilizes an upper bracket 132 having apertures through which screws 134 extend and are connectable to threaded apertures of an upper ceiling of a raceway interior (not shown). The first mounting bracket 110 also includes a junction block mount 136. The junction block mount 136 includes mounting bracket slots 138 positioned at opposing ends of the mount 136. The slots 138 are utilized to receive flanges of the mount 132. Centered on the junction block mount 136 is a mount capture 140. The mount capture 140 captures a center flange of the mount 132, so as to appropriately position and stabilize the junction block 102 with the connection to an office furniture panel. FIG. 110 illustrates one type of mounting bracket, with the same mounting bracket being shown in FIGS. 1 and 2. Various other types of mounting brackets can also be utilized. For example, FIG. 10 illustrates a second mounting bracket 150. The mounting bracket 150 includes a panel connector 152 and junction block connectors 154, positioned on opposing sides of the panel connector 152. A further mounting bracket is illustrated as bracket 160 in FIG. 12. Bracket 160 is typically characterized as a "screw mount" bracket, and utilizes a junction block connector base 162, which is connected to the appropriate junction block and provides for a vertical bracket mount 164. The vertical bracket mount 164 utilizes screw apertures 166 and appropriate screws (not shown) to be connected to a plate or similar element of an office furniture panel (not shown). The mounting assemblies shown herein can be utilized with the flat wire assembly 100. Other types of known mounting assemblies can also be utilized. For example, the inventor of the present invention is also the inventor of mounting brackets illustrated in the following U.S. patents: MOUNTING ASSEMBLY, U.S. Pat. No. 4,993,576 issued Feb. 19, 1991; ELECTRICAL INTERCONNECTION ASSEMBLY, U.S. Pat. No. 5,171,159 issued Dec. 15, 1992; MOUNTING ASSEMBLY, U.S. Pat. No. 5,259,787 issued Nov. 9, 1993; and DUAL ENTRY CANTILEVER LATCH, U.S. Pat. No. 6,343,947 issued Feb. 5, 2002.

Figure 35:
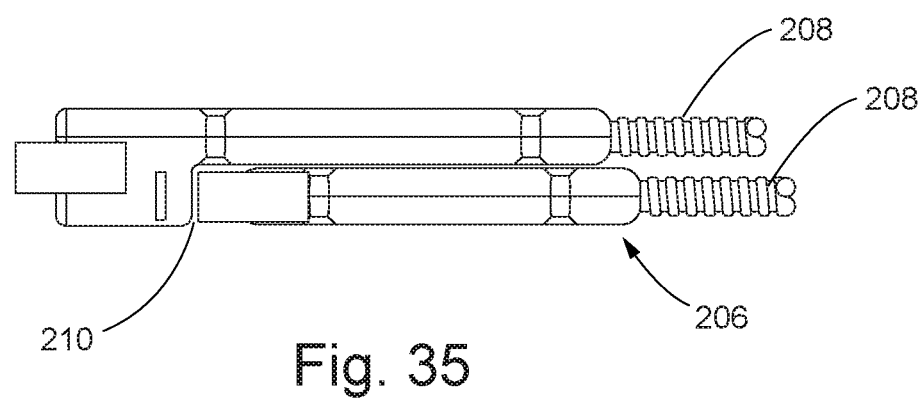
FIG. 35 is an illustration of the male/female jumper shown in FIG. 28, and further showing a configuration where a female jumper can be electrically connected to the male connection of the male/female jumper.
Figure 36:
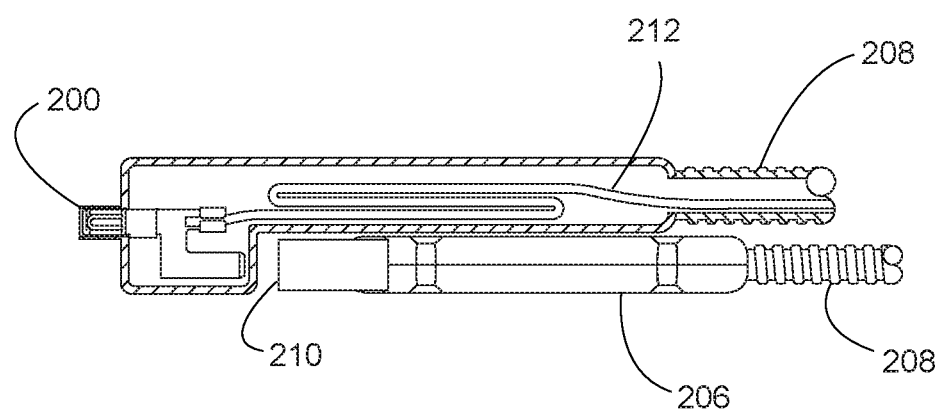
FIG. 36 is a plan view of the male/female jumper shown in FIG. 28, and showing the jumper in FIG. 35 with the electrical attachment of the female jumper, and with FIG. 36 further showing an interior of a housing of the male/female jumper, with a wire curled within the interior for purposes of enabling adjustability.
Figure 37:
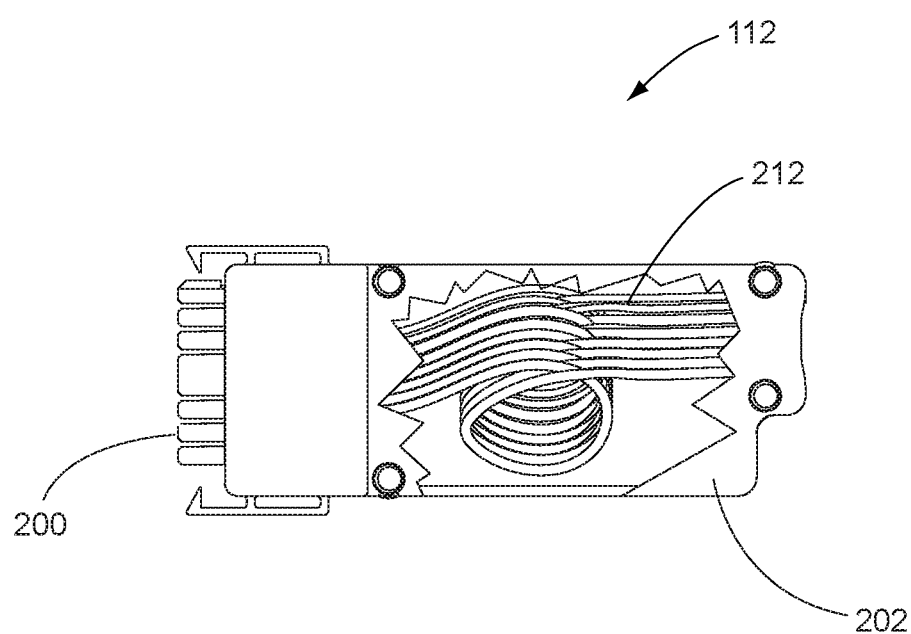
FIG. 37 is a front-elevation view similar to FIG. 36, and further showing the housing of the male/female jumper with a cutout portion so as to view the curled wires which may be utilized to enable adjustability.

In addition to the appropriate mounting brackets, the flat wire assembly 100 also includes, as an example, a male/female jumper 112. The male/female jumper 112 is shown in FIGS. 1 and 2, and is also shown in detail in various configurations in FIGS. 28-34. The male/female jumper 112, with reference to FIGS. 28-33, includes a female jumper connection 200, particularly shown in FIGS. 28 and 31. The female jumper connector 200 is adapted to electrically connect to a jumper block jumper connector 120, particularly shown in FIG. 7. Extending in an opposing direction from the female jumper connector 200, and connected thereto, is a male connector 204, particularly shown in FIG. 33. The male connector 204 is adapted to connect to other jumper cables, having female connectors. Such connections are shown in FIGS. 35 and 36, where a female jumper 206 is illustrated, with a conduit 208. The female jumper 206 includes a female jumper connector 210, which is adapted to connect comprising the male connector 204 of the jumper 112. In addition to this connection, the jumper 112 includes a housing 202. As illustrated in FIG. 35, the housing is connectable to a further female jumper having a conduit 208. Within the interior of the housing 202, the jumper 112 may include curled wire in the form of adjustable wire cable 212. The adjustable wire cable 212 provides for the capability of extension and retraction of the wire or cable associated with the jumper 112. Accordingly, certain adjustability is provided with respect to the jumper 112.

Additional elements and features of the flat wire junction block 102 will now be described, primarily with respect to FIGS. 1-9. As illustrated therein, the junction block 102 includes a pair of junction block receptacle connectors 114. These connectors are male connectors and are positioned on the flat wires of the junction block 102 so as to receive female connectors from the previously described duplex receptacles 104. The junction block receptacle connectors 114 include a pair of front junction block receptacle connectors 115 shown particularly in FIGS. 3 and 6, and a rear set of junction block receptacle connectors 128 primarily shown in FIG. 9. Again, these junction block receptacle connectors 114 are adapted to electrically interconnect to the receptacle connectors 180 which are in the form of female connections.

Figures 5, 6, 7:
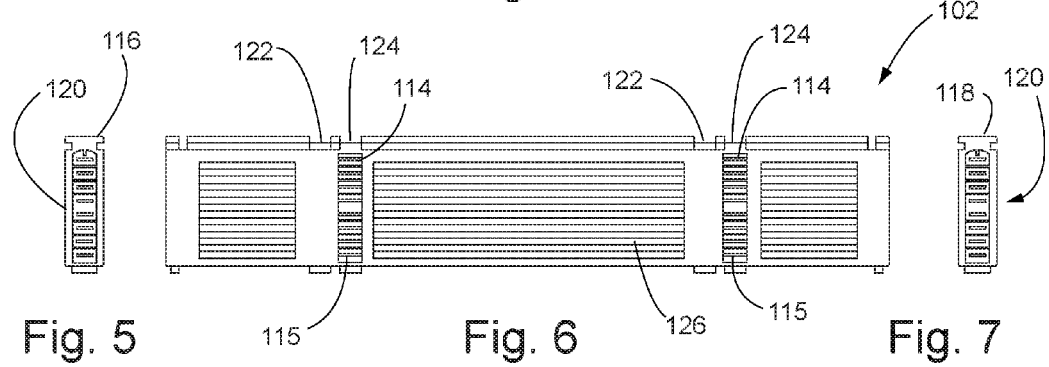
FIG. 5 is a left-hand view of the flat wire junction block shown in FIG. 4, and further showing the male connection terminal.
FIG. 6 is a front view of the flat wire junction block shown in FIG. 4, with two male connections shown on opposing sides.
FIG. 7 is a right-hand view of the flat wire junction block shown in FIG. 4, and further showing a male connector.
Figure 8:
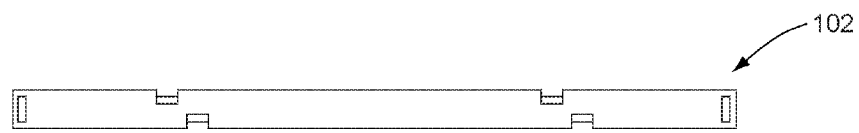
FIG. 8 is an underside view of the flat wire junction block shown in FIG. 4.
Figure 9:
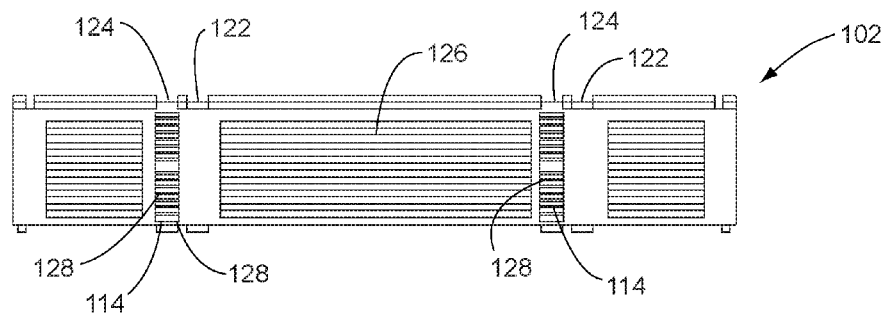
FIG. 9 is a rear view of the flat wire junction block shown in FIG. 4, and again showing two male connectors on opposing sides.

In addition to the junction block receptacle connectors 114, the junction block 102 also includes a left side junction block connector 116 (shown in FIG. 5) and a right side junction block connector 118 (shown in FIG. 7). The connectors 116 and 118 can each be characterized as a junction block jumper connector 120. These connectors are male connections and are adapted to electrically connect to female connections of jumper cables and the like. For example, the right side junction block connector 118 is shown in FIG. 2 as being connected to the male/female jumper 112.

For purposes of releasably securing the duplex receptacles 104 to the junction block 102, the duplex receptacles 104 can be positioned on the junction block 102 as primarily shown in FIGS. 1 and 2. For purposes of this connection, the junction block 102 includes a pair of receptacle block brackets 122, 124, respectively. It should again be stated that the connections provided by the junction block receptacle connection 114 and the duplex receptacle connectors 180 connect the duplex receptacles 104 to the flat wire blades 126 of the junction block 102.

Figure 38:
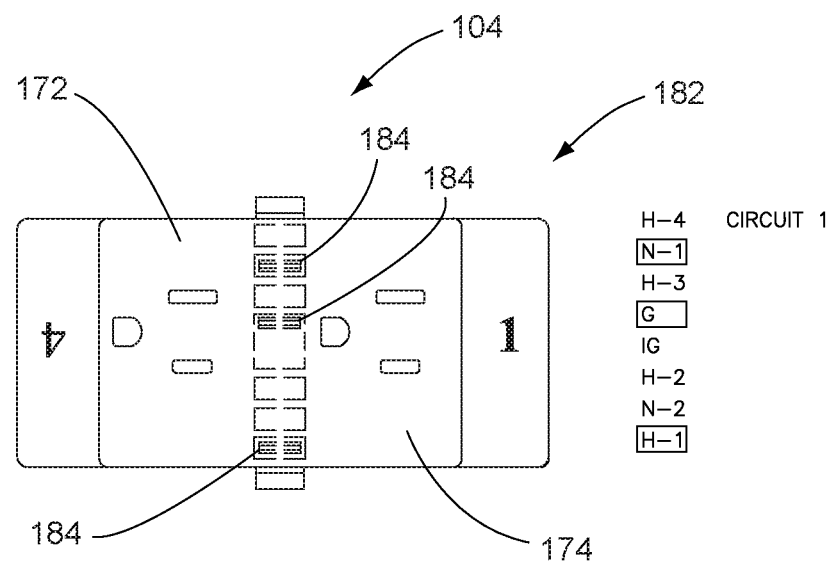
FIG. 38 is a partial schematic and partial mechanical illustration of the two-way duplex receptacle in a circuit 1 configuration, and showing locations of female terminals for connection to the flat wire junction block utilizing an 8-wire configuration.
Figure 39:
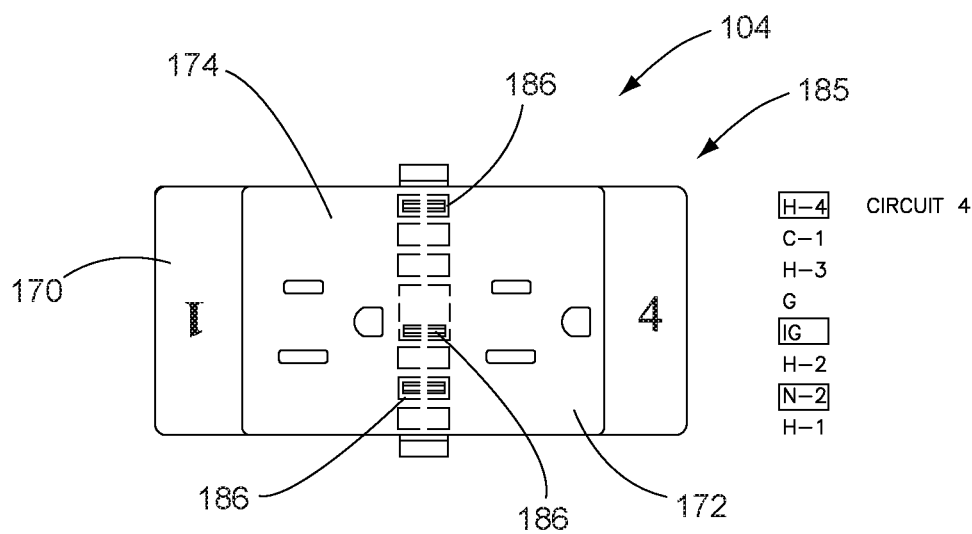
FIG. 39 is a partially schematic and partially mechanical illustration similar to FIG. 38, but showing the two-way duplex receptacle and female terminal locations for a circuit 4 configuration within a flat wire 8-wire configuration.

The flat wire blades 126 can carry two circuits, with each circuit utilizing at least three of the blades, comprising odd, neutral, and ground polarities. The duplex receptacle connectors 180 include female connectors at specific positions on the connector set, with the specific positions determining which of the circuits of the junction block 102 the receptacle will be connected to. As earlier described, orientation of the duplex receptacle 104 and 1 position will provide for a circuit 1 connection, while a 180° rotation will provide for a circuit 4 connection. FIGS. 38 and 39 illustrate the two orientations of the duplex receptacles 104 so as to achieve the circuit configurations. Specifically, FIG. 38 illustrates the circuit 1 configuration, with the circuit being designated as circuit 182. This circuit utilizes female terminals 184. Similarly, FIG. 39, which illustrates circuit 4, and designated circuit 185. Circuit 185 includes female connectors or terminals 186, again as shown in FIG. 39. Each of FIGS. 38 and 39 also show the particular plurality configurations, with the specific terminals being designated as neutral, ground or hot wire configurations.

The primary concepts described hereinbelow are disclosed, by way of example, in an adjustable flat wire assembly 300 as primarily shown in FIGS. 40-57. A number of the elements of the assembly 300 correspond to elements previously described with respect to the assembly 100, and will not be repeated herein in any detail. Also, other elements, such as mounting brackets and the like, which were previously described with respect to the assembly 100 should be understood to be capable of use with the adjustable assembly 300, but again will not be repeated. The primary concept of the adjustable flat wire assembly 300 is to provide the capability of, within a flat wire circuit, being able to adjust the length of the assembly 300 between an extended mode and a retracted mode.

Turning to the drawings, the flat wire assembly 300 is illustrated in perspective view in FIG. 40, with the assembly in what can be characterized as a "retracted" state. The assembly 300 is shown as having an adjustable flat wire junction block 302, similar to the junction block 102 previously described herein. The junction block 302 is illustrated in FIG. 40 as having a main body 304. Extending outwardly from the main body 304 is an extender 306. Extending outwardly from the outer end of the extender 306 is a cable 308 which houses wires connected to the blade circuitry within the interior of the main body 304. One end of the cable 308 is connected to the end of the extender 306 at respective gripping portions 309 of a cover plate extender 323 and a slide bracket 338, with individual wires 340 of the cable 308 terminated as described below, while the opposing end of the cable 308 is connected to an end jumper 310. The end jumper 310 can be utilized to connect to further jumper cables, through the male jumper connector 312 extending from the end thereof. A junction block connector 314 extends from the opposing end of the main body 304, as particularly shown in FIG. 46.

Figure 41:
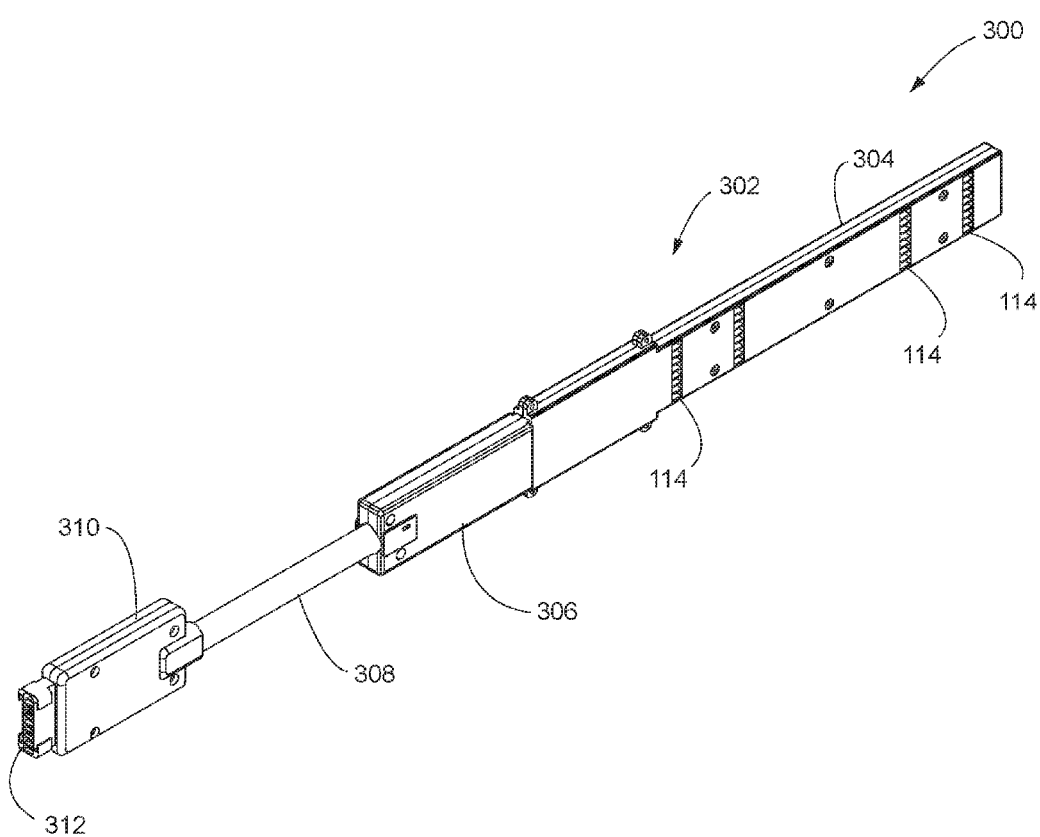
FIG. 41 is a perspective view of the adjustable flat wire assembly shown in FIG. 40, but showing the assembly in an extended configuration.
Figure 42:
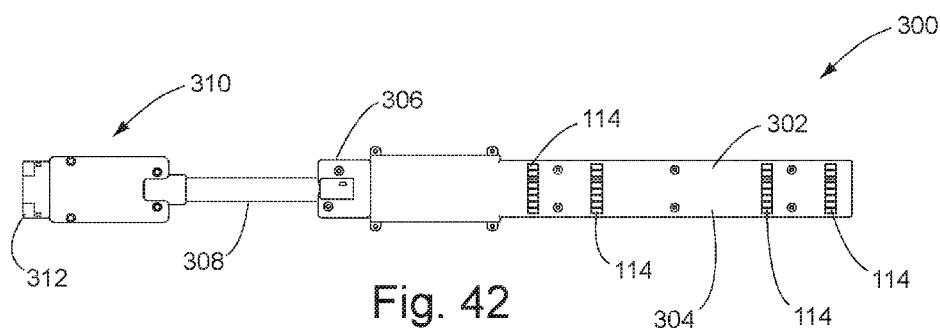
FIG. 42 is a side, elevation view of the adjustable flat wire assembly shown in FIG. 40.
Figure 43:
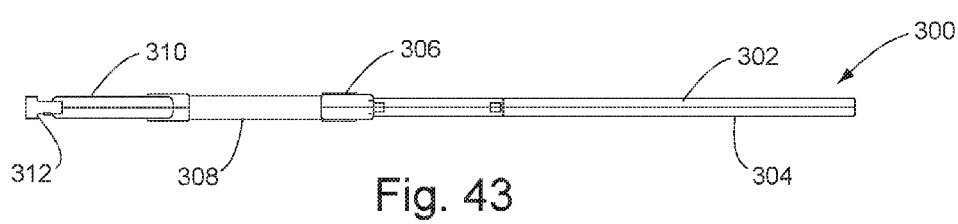
FIG. 43 is a plan view of the adjustable flat wire assembly shown in FIG. 42.
Figures 44, 45, 46:
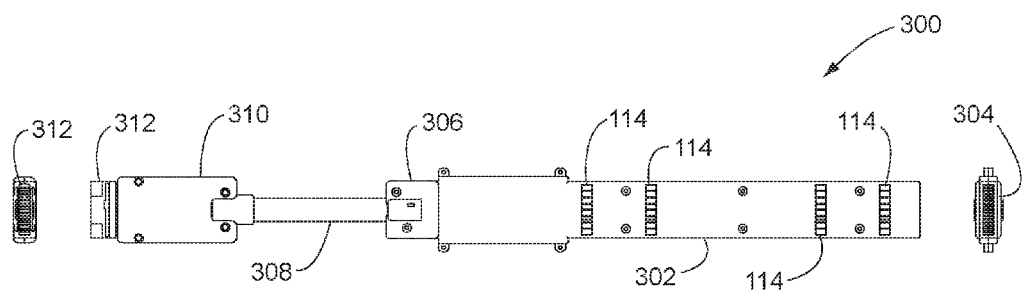
FIG. 44 is a left-side view of an end of the adjustable flat wire assembly shown in FIG. 40, and further showing a male connection.
FIG. 45 is a side, elevation view of the adjustable flat wire assembly shown in FIG. 40, but showing an opposing side of the assembly relative to the side shown on FIG. 42.
FIG. 46 is a right-side elevation view of the adjustable flat wire assembly shown in FIG. 40, and further showing a male connection.
Figure 47:
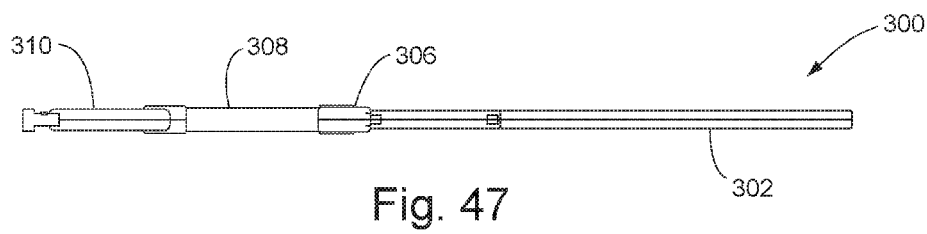
FIG. 47 is an underside view of the adjustable flat wire assembly shown in FIG. 40.

As earlier stated, FIG. 40 illustrates the adjustable flat wire assembly 300 in a "retracted" mode, in that the extender 306 is telescoped into an end of the main body 304 of the junction block 302. FIG. 41 illustrates the adjustable flat wire assembly 300 in the "extended" state. In this state, the extender 306 extends outwardly from the end of the main body 304 of junction block 302.

Figure 48:
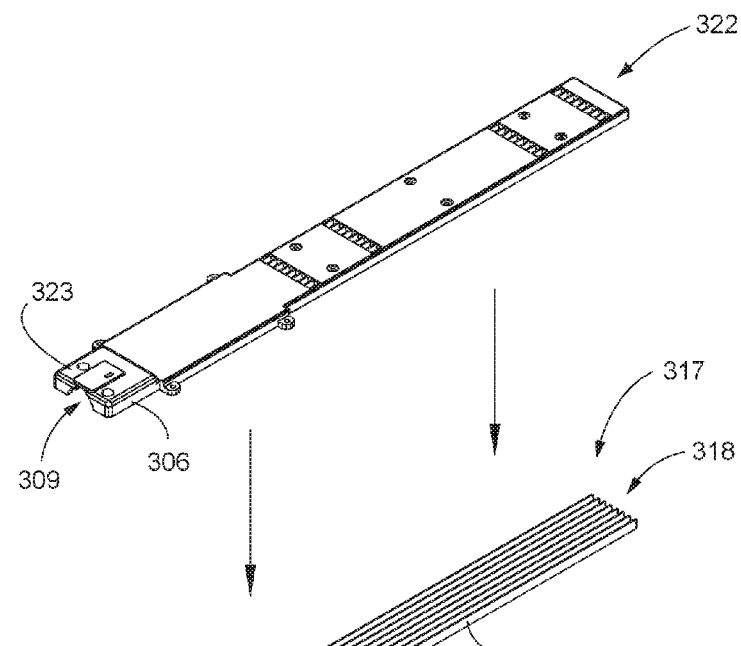
FIG. 48 is a perspective view of a first side housing for the adjustable flat wire assembly shown in FIG. 40.
Figure 49:
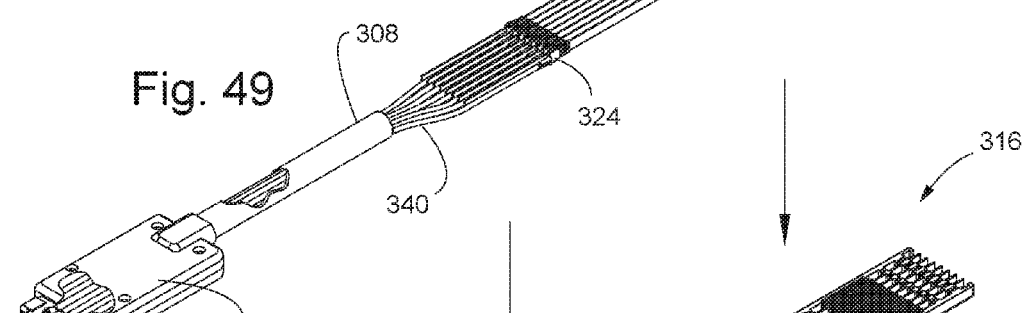
FIG. 49 is a perspective view showing the internal flat wire configurations of the adjustable flat wire assembly shown in FIG. 40.
Figure 50:
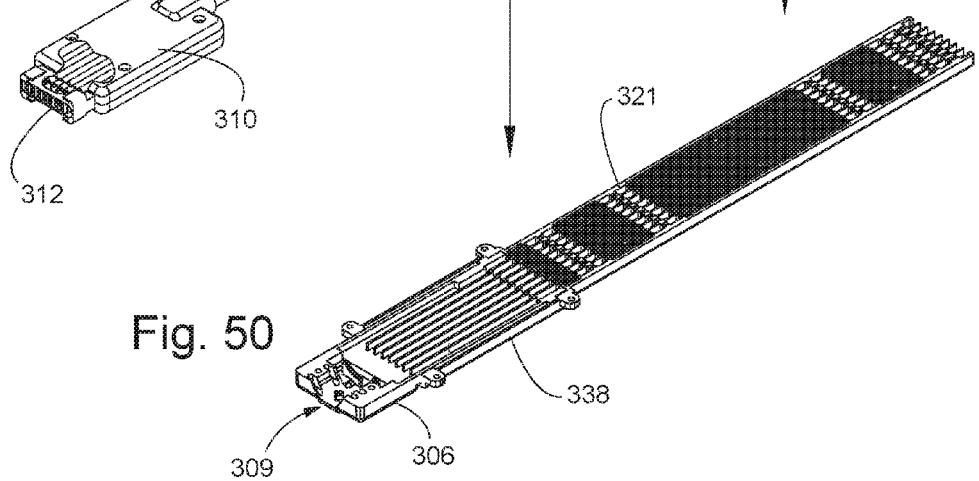
FIG. 50 is a perspective view of a second side housing of the adjustable flat wire assembly shown in FIG. 40, and showing the slotting within which the flat wires shown in FIG. 49 are positioned during use.

FIGS. 42-47 illustrate various views of the entirety of the adjustable flat wire assembly 300. FIGS. 48-50 illustrate the adjustable flat wire assembly 300 in an exploded view, showing its various components. With reference specifically to FIGS. 48, 49 and 50, the adjustable flat wire assembly 300 includes a base 316. The base 316 includes a pair of slide brackets 338 shown in FIGS. 53 and 56. Specifically, in FIG. 50, the slide brackets 338 are shown in a retracted state. In contrast, FIGS. 53 and 56 illustrate the slide brackets 338 in an extended state.

In addition to the base 316, the junction block 302 includes a center section 317. The center section 317 includes the internal blade circuit 318. The internal blade circuit 318 includes a series of flat wire blades 320. Covering the center section 317 is a cover plate 322. The cover plate 322 includes the cover plate extender 323. In FIG. 48, the cover plate extender 323 is shown in the retracted state. Correspondingly, the slide brackets 338 are shown in FIG. 50 in the retracted state. Base 316 includes a series of upright walls or bar-like members 321 (FIGS. 50 and 53) that extend inwardly toward cover plate 322 and are disposed in the spaces between the flat wire blades 320 when cover 322 is assembled to base 316 with flat wire blades 320 disposed in center section 317.

A further exploded view of the adjustable flat wire assembly 300 is illustrated in the combination of FIGS. 51, 52 and 53. Therein, the slide brackets 338 are shown in FIG. 53 in an extended state. Correspondingly, FIG. 51 illustrates the cover plate extender 323 in an extended state.

Figure 54:
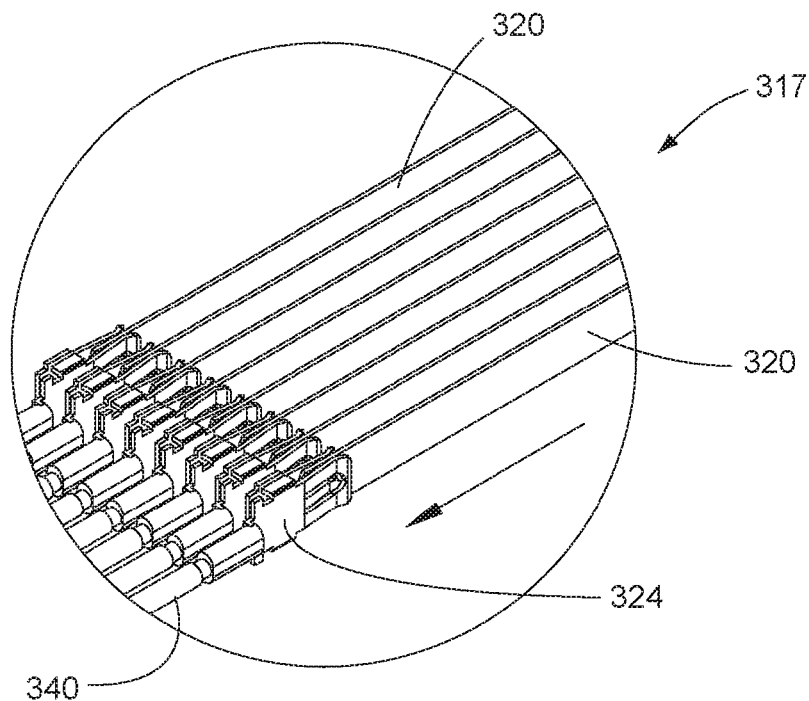
FIG. 54 is an enlarged view of a portion of the adjustable flat wires of the flat wire assembly shown in FIG. 40, with the wire connection assembly being shown in an extended state.
Figure 55:
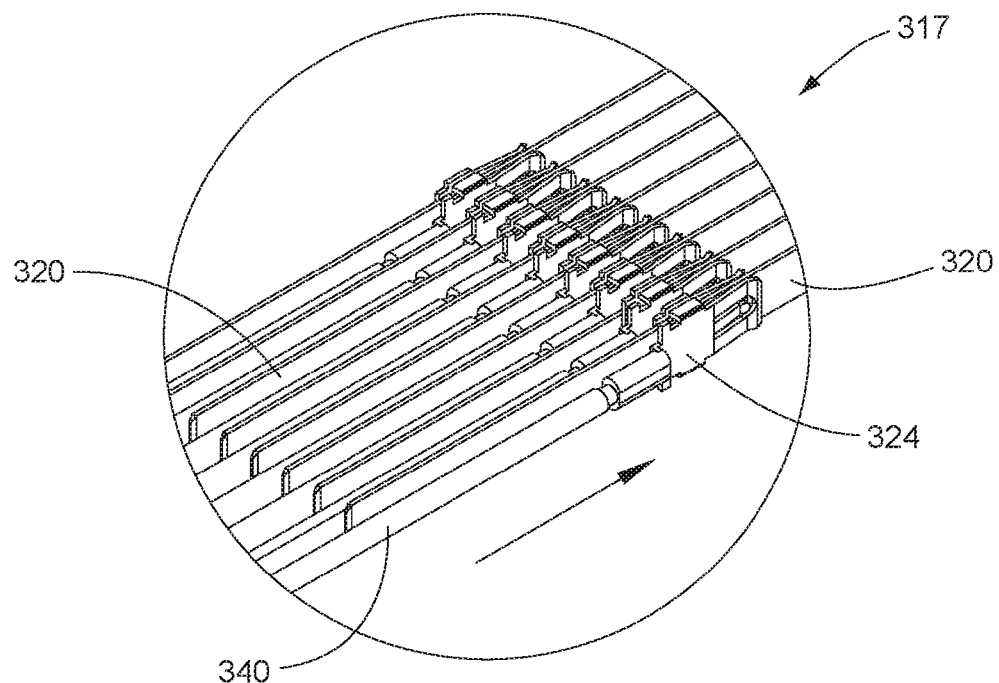
FIG. 55 is an enlarged view of a portion of the adjustable flat wire assembly shown in FIG. 41, with FIG. 55 being similar to FIG. 54, but showing the flat wire assembly in a retracted state.

For purposes of providing for the extension and retraction of the circuitry so as to achieve adjustment in length of the assembly 300, a set of blade/wire connectors 324 are utilized, as shown in FIGS. 54 and 55. The blade/wire connectors 324 connect the flat wire blades 320 to wires 340 illustrated in FIGS. 49, 54 and 55.

In operation, the adjustable flat wire assembly 300 may first be presumed to be in a retracted state as shown in FIG. 40 and FIGS. 42-50. The cover plate extender 323 is in the retracted state as particularly shown in FIG. 48. The slide brackets 338 are positioned as particularly shown in FIG. 57. This position is also shown in FIG. 50 showing the base 316 and slide brackets 338. In this position, the length of the adjustable flat wire assembly 300 is at its minimum. To extend the flat wire assembly 300 to its extended position, the cover plate extender 323 is first slid outwardly to the position particularly shown in FIG. 51. The slide brackets 338, associated with the base 316, are then also positioned so as to be slid outwardly. The base is then in the position as shown in FIG. 53. The sliders 326 are utilized to slide along the flat wire blades 320 until they are positioned as shown in FIG. 54. As in the retracted position, the flat wire blades 320 remain electrically connected to the wires 340, whether in the extended or retracted position. This position of the center section 317 with the sliders 326, blades 320 and wires 340 is shown particularly in FIG. 52. A close-up view of the relationship between the sliders 326, flat wire blades 320 and wires 340, when in the extended position, is shown in FIG. 54. In accordance with all the foregoing, the adjustable flat wire assembly 300 provides for the capability of adjusting the lengths of the assembly 300 along a continuum between a fully extended position and a fully retracted position.

It will be apparent to those skilled in the pertinent arts that still other embodiments of adjustable flat wire assemblies in accordance with the invention can be designed. That is, the principles of an adjustable flat wire assembly in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A flat wire assembly adapted for use in a power distribution system for distributing power to electrical receptacles and other electrical components, said flat wire assembly comprising:
   at least one flat wire junction block for transmitting externally received power;
   a set of conductive flat wire blades positioned within an interior of said flat wire junction block, said blades forming at least one three blade circuit carrying electrical power in the form of hot, neutral and ground polarities;
   an extender coupled to said flat wire junction block and movable in a telescoping manner between a retracted position and an extended position relative to said flat wire junction block;
   a set of wires substantially longitudinally aligned with respective ones of said flat wire blades;
   a plurality of wire/blade connectors for electrically connecting said set of wires to respective ones of said flat wire blades;
   junction block receptacle connectors on each side of said flat wire junction block, wherein said junction block receptacle connectors provide access through said flat wire junction block to said conductive flat wire blades; and
   an electrical receptacle having a rear connector configured to engage one of said junction block receptacle connectors and thereby connect directly to said conductive flat wire blades;
   wherein, as said extender is extended and retracted relative to said flat wire junction block, said wire/blade connectors maintain electrical continuity between said flat wire blades and said wires and said rear connector of said electrical receptacle maintains electrical continuity with said conductive flat wire blades.

2. A flat wire assembly in accordance with claim 1, wherein said wire/blade connectors permit adjustment of the length of said flat wire assembly anywhere along a continuum between said extended position and said retracted position.

3. A flat wire assembly in accordance with claim 1, further comprising:
   a cable having wires positioned therein extending outwardly from a distal end of said extender, said cable housing wires connected to said flat wire blades within an interior of said flat wire junction block;
   an end jumper having a male jumper connector extending from an end thereof;
   one end of said cable being connected to said distal end of said extender, with an opposing end of said cable being connected to said end jumper;
   said end jumper configured to connect to further jumper cables through said male jumper connector;
   a junction box connector extending from an opposing end of said flat wire junction block opposite said extender.

4. A flat wire assembly in accordance with claim 3, wherein when said flat wire assembly is in said retracted position, said extender is telescoped into an interior of said flat wire junction block and spaced from said junction block receptacle connectors.

5. A flat wire assembly in accordance with claim 3, wherein said extender comprises a pair of slide brackets positioned in said flat wire junction block, and extendable between said retracted position and said extended position.

6. A flat wire assembly in accordance with claim 5, wherein said flat wire junction block comprises:
   a base having a center section, said center section comprising said internal blade circuit, with said internal blade circuit comprising said set of flat wire blades; and
   a cover plate having a center section covering said center section of said base;
   wherein said center sections of said base and of said cover plate define respective ones of said junction block receptacle connectors between said junction box connector and said extender in said retracted position.

7. A flat wire assembly in accordance with claim 1, wherein said junction block receptacle connectors comprises male connectors.

8. A flat wire assembly in accordance with claim 7, wherein said electrical receptacle comprises a duplex receptacle that can be oriented in either of two spatial orientations so as to engage different ones of said conductive flat wire blades with said rear connector to thereby provide alternative circuits.

9. A flat wire assembly in accordance with claim 1, further comprising a mounting bracket for mounting said flat wire assembly to a raceway of an office furniture panel.

10. A flat wire assembly in accordance with claim 1, further comprising a male/female jumper configured to connect a female jumper to a male connector of said flat wire junction block.

11. A flat wire assembly adapted for use in a power distribution system for distributing power to electrical receptacles and other electrical components, said flat wire assembly comprising:
    a flat wire junction block for transmitting externally received power, said flat wire junction block having a main body and an extender, wherein said main body comprises first and second opposite end portions and a central portion disposed between said first and second end portions, and wherein said extender is telescopingly mounted to said first end portion of said main body and said extender is movable in a telescoping manner between a retracted position and an extended position relative to said first end portion of said flat wire junction block;
    a set of conductive flat wire blades positioned within an interior of said main body and extending from said first end portion to said second end portion and at least partially into said extender in both said extended position and said retracted position, wherein said flat wire blades form at least one three-blade circuit;
    a set of round wires substantially longitudinally aligned with respective ones of said flat wire blades;
    a plurality of wire/blade connectors for electrically connecting said wires to respective ones of said flat wire blades, wherein said wire/blade connectors comprise a sliding contact portion for slidably engaging said conductive flat wire blades along said first end portion of said main body; and
    a junction block receptacle connector on one side of said central portion of said main body, wherein said junction block receptacle connector provide access through said central portion of said main body to said conductive flat wire blades, whereby portions of said conductive flat wire blades at said junction block receptacle provide male contact portions that are engageable by respective female contact portions of an electrical receptacle;
    wherein, as said extender is extended and retracted relative to said flat wire junction block, said wire/blade connectors maintain electrical continuity between said wires and said flat wire blades along said first end portion of said main body.

12. A flat wire assembly in accordance with claim 11, wherein each of said conductive flat wire blades has a constant cross section along its entire length.

13. A flat wire assembly in accordance with claim 11, further in combination with said electrical receptacle, wherein said female contact portions of said electrical receptacle are disposed along a rear surface thereof.

14. A flat wire assembly in accordance with claim 13, comprising a second junction block receptacle connector on an opposite side of said central portion of said main body, and further in combination with a second electrical receptacle having female contact portions configured for engagement with respective ones of said flat wire blades at said second junction block receptacle connector.

15. A flat wire assembly in accordance with claim 11, wherein said wire/blade connectors each comprise a crimp portion opposite said sliding contact portion, wherein said crimp portions are configured for electrically engaging and mechanically securing to said wires.

\* \* \* \* \*